H. BUTTS.
AIRCRAFT LAUNCHING AND LANDING MEANS.
APPLICATION FILED JULY 31, 1919.

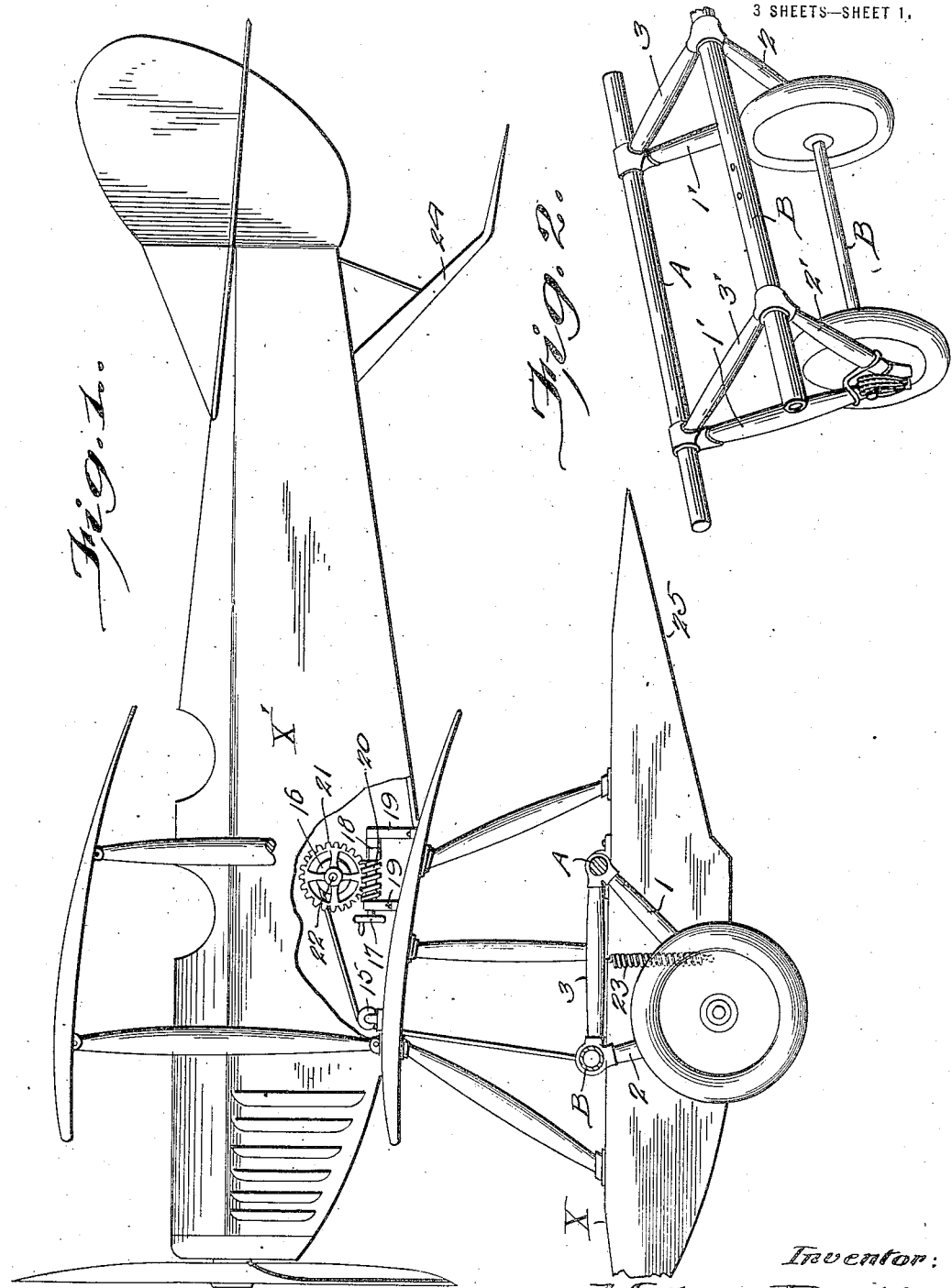

1,371,989.

Patented Mar. 15, 1921.
3 SHEETS—SHEET 3.

UNITED STATES PATENT OFFICE.

HEBER BUTTS, OF SAN DIEGO, CALIFORNIA.

AIRCRAFT LAUNCHING AND LANDING MEANS.

1,371,989.  Specification of Letters Patent.  Patented Mar. 15, 1921.

Application filed July 31, 1919. Serial No. 314,463.

*To all whom it may concern:*

Be it known that I, HEBER BUTTS, a citizen of the United States, residing at San Diego, in the State of California, have invented new and useful Improvements in Aircraft Launching and Landing Means, of which the following is a specification.

My invention relates to improvements in launching and landing means for aircraft, wherein provision is made for launching an aeroplane equally well from the surface of the ground or water, and bringing it to rest equally well upon the surface of the ground or water. In the particular form disclosed the device consists of a rigid V-type wheeled landing gear attached to a rectangular framework, two sides of which are formed by two horizontal tubular bars. Both of these horizontal bars project over and across the superior surfaces of two pontoons. One of the bars is hinged at each end to the two pontoons, while the other bar is locked at each end to the two pontoons by an automatic locking device. An elevating device, operated by the aviator from his seat, is connected with the wheeled landing gear for unlocking and elevating it above, and lowering and locking it to, the two pontoons, as occasion requires.

Heretofore, in constructing launching and landing gear for aircraft which are designed to accomplish the dual purpose of launching and alighting on the surface of ground or water, it has been proposed to make use
(1) of collapsible or folding wheel types of structures for landing gear wheels combined with pontoons; (2) of a boat provided with a false bottom carrying a landing gear such as skids and wheels; (3) of an axle with landing wheels and a lifting plane suspended beneath and between pontoons or floats.

It is believed that (1) all collapsible or folding wheel types of convertible chassis are necessarily much weakened and complicated in structure in order to make them collapsible; (2) that flying boats provided with false bottoms and skids and wheels for landing upon the ground are equipped more particularly for aquatic service, and are usually unduly heavy, and cannot be regarded as equally well adapted for ground service; (3) that hydroaeroplanes equipped with axles, landing wheels and lifting planes suspended beneath pontoons are unduly heavy and cumbersome, and difficulty is encountered when the hydroaeroplane attempts to leave the water, because of the great resistance which these parts (in addition to the pontoons or floats) must offer as they are dragged through the water.

The present invention avoids these objectionable features (1) by the adoption of a rigid, non-collapsible, adequately strutted and trussed V-type or other suitable wheeled landing gear which is essentially of the same general structure as those most commonly in use on present day aeroplanes; (2) by simplicity of design and fewer and stronger parts than can form the construction of any practical collapsible or folding convertible aeroplane chassis; (3) by elevating the wheeled landing gear with its framework entirely above the pontoons when it is desired to rise from or to alight upon the water.

The prime objects of my improvements are, first, to provide a means which will permit an aeroplane to be launched equally well from the surface of the ground or water; second, to provide a means which will permit an aeroplane to alight equally well on the surface of the ground or water; third, to provide a means which will permit a change of chassis in an aeroplane while in flight, for landing purposes, from wheels to pontoons, or vice versa, safely, quickly and easily. Coördinate objects are simplicity of design, protection of the wheel landing gear from water, sturdiness of structure, and a minimum of weight, air and water resistance.

It will, of course, be understood that while I have shown and described certain preferred structures and types of means for carrying my invention into practical effect, the invention is not limited thereto except when particularly specified in the claims, as any substantial equivalents thereof may be employed within the spirit and scope of the invention.

In the accompanying drawings similar numerals refer to similar parts throughout the several views:

Figure 1 is a side elevation of a single motored aeroplane of the tractor biplane type (parts having been omitted in order not to complicate the drawing), showing the manner in which the present invention is attached to an aeroplane and forms part of it;

Fig. 2 is an outline perspective view of the framework (including landing wheels, axle, struts, posterior hinge bar and anterior lock bar) of the wheel landing gear of the present chassis dissociated from the pontoons and windlass elevating device which also form part of the present invention;

Figure 3:
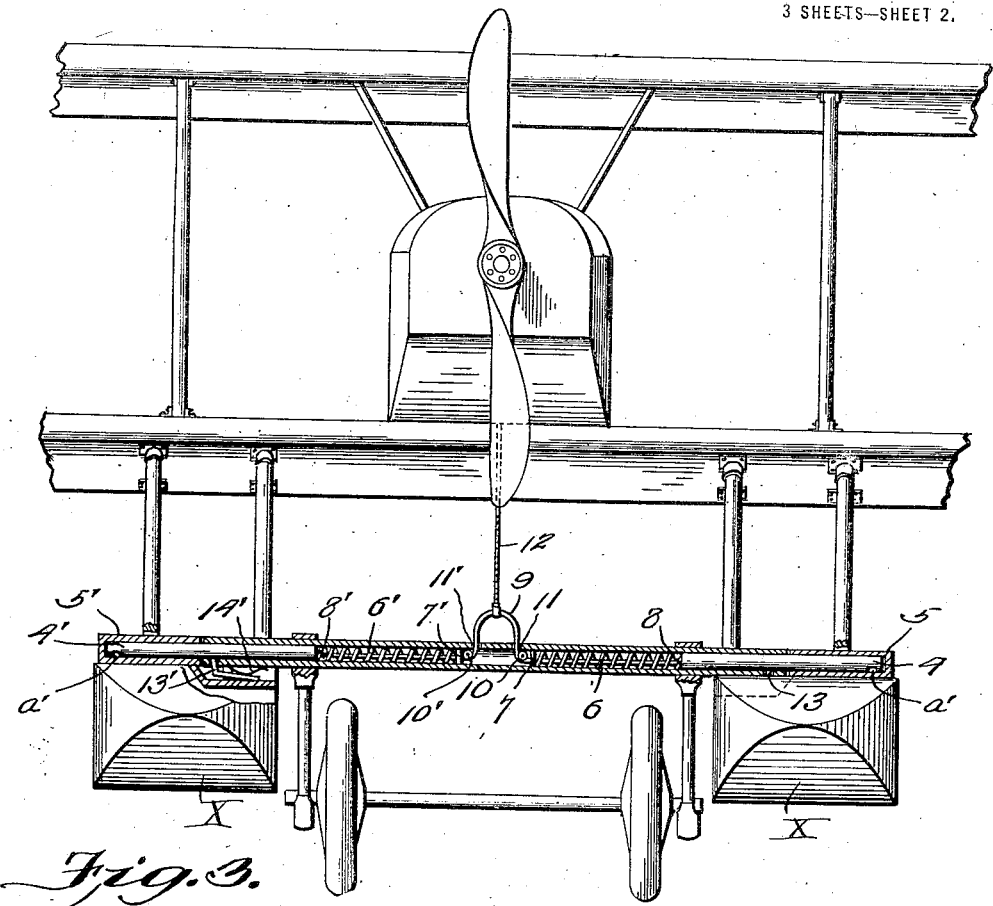
Fig. 3 is a front elevation, showing the wheeled landing gear locked to and between the two pontoons of the convertible chassis in proper position for being launched from or alighting upon the ground, with detailed construction of preferred automatic locking device.

This chassis is designed for use on any type of aircraft which can be equipped with two pontoons or floats. It consists of a rigid rectangular framework, to the four inferior corners of which are attached the superior ends of V-type wheeled landing gear struts, the inferior ends of said struts being united together by appropriate strut fittings, shock absorbers and axle guides for the axle of the wheel landing gear. One side of the rectangular framework is formed by a steel tubular bar A (Figs. 1, 2, 5 and 6) which projects beyond the framework and over and across the posterior superior surfaces of the two pontoons X, and is hingedly connected therewith. Each of the two struts 1 and 1' are rigidly attached to this steel bar and framework.

The opposite side of the rectangular framework is formed by steel tubular bar B, to which are rigidly attached the two struts 2 and 2'. The two remaining sides of the rectangular framework are formed by wooden bars or members 3 and 3' which are designed to act as braces to insure rigidity and sturdiness for the wheeled landing gear.

Into the ends of anterior steel tubular bar B (Figs. 1, 2, 3, 4, 5 and 6) are telescoped sliding bolts 4 and 4' (Figs. 2 and 3) which project over and across the anterior superior surface of the two pontoons and fit into pontoon bolt housings or keepers 5 and 5'. These sliding bolts are securely locked in this position when the aviator wishes to launch his machine from or to alight on the ground, by the device now to be described.

Figure 4:
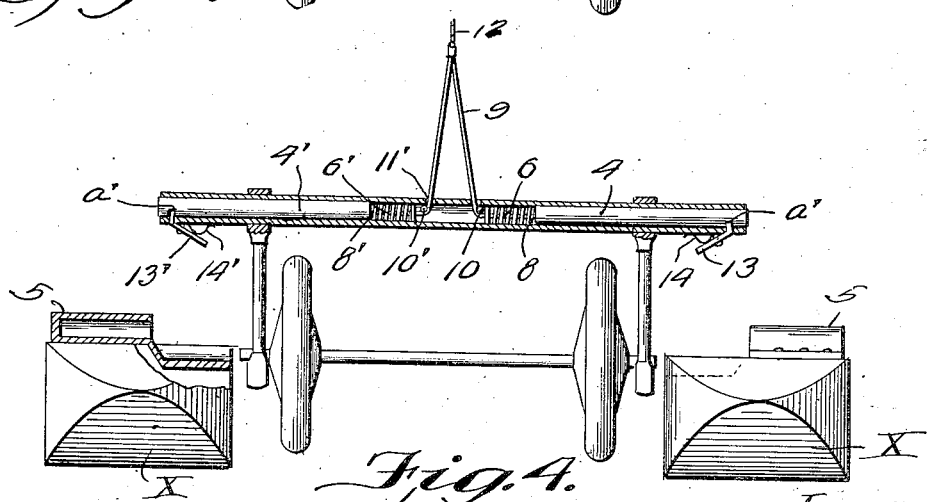
Fig. 4 is a sectional view of anterior bar of wheeled landing gear just after it has been unlocked and elevated above the two pontoons of the convertible chassis.

In the interior of the anterior tubular bar B are loosely placed spiral springs 6 and 6' (Figs. 3 and 4). These springs impinge against the inner ends of sliding bolts 4 and 4', and the diaphragms 7 and 7' form fixed abutments for the springs. Eye-screws 8 and 8', for the attachment of the ends of steel cable 9, are fixed in the center of the inner ends of sliding bolts 4 and 4'. This steel cable passes through spiral springs 6 and 6', through openings in the diaphragms 7 and 7', over pulleys 10 and 10', and through the holes 11 and 11' in tubular bar B.

The bolts 4 and 4' are designed to be pulled toward one another by steel cable 9. At the bight or mid portion of rope or cable 9 is attached rope or cable 12. When rope or cable 12 is pulled by the operation of the windlass presently to be described, bolts 4 and 4' approach one another, and spiral springs 6 and 6' are compressed by these bolts, as shown in Fig. 4.

Figure 5:
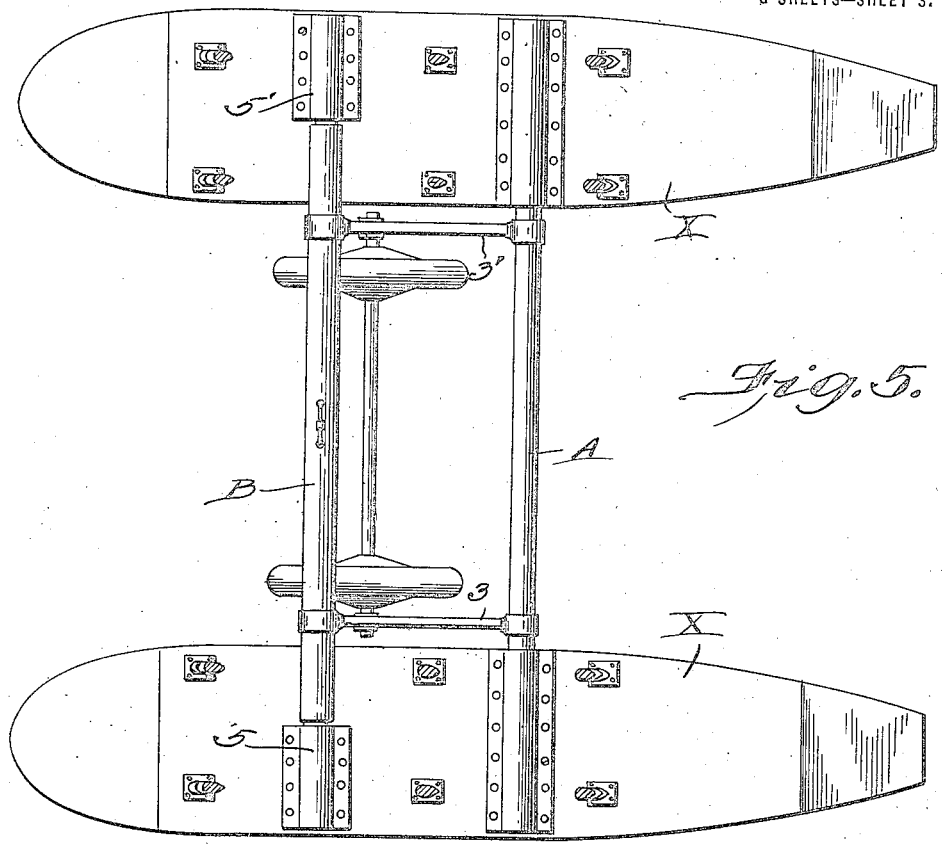
Fig. 5 is a top plan view of the pontoons and wheeled landing gear, the parts of the aeroplane above the chassis not being shown.
Figure 6:
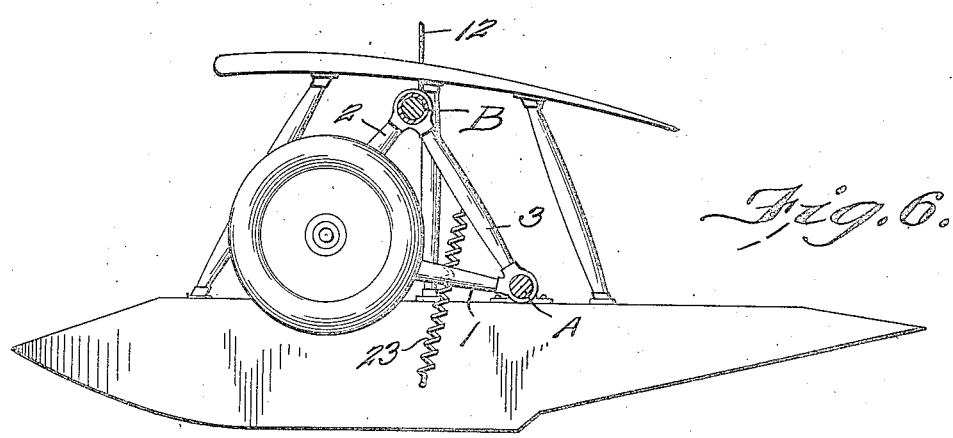
Fig. 6 is a side elevation, showing the wheeled landing gear, unlocked from and elevated above one of the two pontoons of the chassis, in the normal position for launching from or alighting upon water.

When the bolts 4 and 4' are telescoped sufficiently far into tubular bar B, the short arms $a$ of pivoted bell-crank dogs or clutches 13 and 13', are caused to engage notches $a'$ in the outermost ends of bolts 4 and 4', by the action of flat steel springs 14 and 14', securely locking bolts 4 and 4' in these positions, and allowing the dogs to clear bolt keepers 5 and 5'. At this point a continued pull on the cable 12 will cause the anterior portion of the wheeled landing gear framework to be lifted out of housings 5 and 5', and to be swung upwardly and rearwardly toward the inferior surface of the fuselage and lower plane of the aeroplane, the posterior portion of the wheeled landing gear framework remaining fixed to the pontoons by means of its hinges with bar A, as shown in Figs. 5 and 6.

In Fig. 1 is shown the cable or rope 12 passing through a hole or slot in the lower plane of the biplane, and over pulley-wheel 15, which is placed in the floor of the fuselage, rearward of the motor, and about on a line with the anterior inter-plane struts. One end of rope or cable 12 is attached to the mid portion of rope or cable 9, and the other end is attached to windlass 16, which is firmly fixed under the seat in the forward cockpit. Windlass 16 is operated by turning hand-wheel 17, which is keyed to one end of a shaft that has its bearings in the box 18 and the supports 19 and 19'. Near the end of this shaft is the worm 20 that meshes worm-wheel 21 and turns windlass 16. An axle 22 passes through the axis of windlass 16, and has its bearings in appropriate boxes in each side of the fuselage under the forward seat. This axle is for the purpose of holding the windlass in place and the worm-wheel in mesh with worm 20. The wheeled landing gear is elevated at will by the aviator by means of this cable and windlass mechanism.

The lowering of the wheel landing gear is chiefly accomplished by the force of gravity, but this force is augmented by spiral springs 23 under tension. One end of this spring is attached to the side of the pontoon, and the other end is attached to the side of the rectangular framework of wheeled landing gear (Figs. 1 and 6). There is a spring for each pontoon, both of equal strength. When the wheeled landing gear has been partially lowered, the rush of air (assuming the aeroplane is in flight) also aids materially in lowering it into position for landing.

As the wheeled landing gear is being lowered to the pontoons, preparatory to putting it into position for landing on the ground, the long arms of dogs or clutches 13 and 13' are the first portions of bar B of the wheeled landing gear to impinge on the offsets or recesses $b$ of the pontoon housings 5 and 5'. The weight of the wheeled landing gear, as it descends, causes the flat springs of these dogs to be compressed, and the short arms of the dogs are forced to clear the ends of bolts 4 and 4'. This releases bolts 4 and 4', and the spiral springs 6 and 6' force the bolts outward and deeply into pontoon housings 5 and 5'. In this manner the wheeled landing gear is locked into position for safely alighting on the ground.

When the wheeled landing gear has been lowered in this manner and locked, its wheels should project 12 or 15 inches below the lower edges of the pontoons. The wheels should touch the ground at such a point that a line drawn from their axles to the center of gravity of the aeroplane will subtend an angle of 13° 10' anterior to a line drawn perpendicularly through the aeroplane's center of gravity.

To prevent the posterior portion of the pontoons from dragging on the ground, a special tail skid 24 (Fig. 1) is provided and should be 12 or 15 inches longer than for an aeroplane designed solely for being launched from and alighting upon the ground. This tail skid may be otherwise similar in general construction to an ordinary tail skid and arranged to coöperate with a suitable shock-absorber.

The tail skid should not be too long, as it is desirable for the posterior inferior portions 25 of the pontoons to drag upon the ground after the axle and shock-absorbing apparatus have reached the upper limit of travel in the axle guides. When this point has been reached the posterior portions of the two pontoons properly begin to take up the shock of a rough landing and by a momentary skidding over the ground tend to act as a brake and to bring the aeroplane to rest. It must be clearly understood, however, that this momentary skidding over the ground on the part of the pontoons is designed to take place only after the shock-absorbing apparatus has been placed under tension, and most of the shock of landing has already been taken up.

Though the pontoons or floats of a seaplane or hydroaeroplane are usually made strong enough to withstand the ordinary stresses incident to weight-bearing and landings, it is desirable to give additional strength to the pontoons at those points at which the hinges and lock housings of the wheeled landing gear are attached to the pontoons. This may be done in the course of construction of the pontoons by equipping them with longitudinal and lateral steel ribs of sufficient strength to withstand the stresses to which the pontoons will be subjected when making a landing. The hinges and lock housings should be made as much an integral part of the pontoons as possible.

I wish to particularly point out that the general structure of neither the V-type wheeled landing gear nor the two pontoons which go to form parts of the present convertible aeroplane chassis make any radical departure from present day construction practice, and that by virtue of these facts, the wheeled landing gear may, when desired, be detached from the pontoons, or, the pontoons may be detached from the aeroplane, and the wheeled landing gear and framework attached, by means of suitable bolts and fittings, directly to the inferior surface of the lower plane and fuselage of the aeroplane. In this manner, whenever desired, the aeroplane may be readily converted into a machine for land service only, or into a machine for aquatic service only, with no additional expense, except for suitable bolts and fittings.

If desired, the dogs may be dispensed with and set screws provided on bar B to engage slots in the bolts to limit the outward movement of the latter.

Having thus fully described my invention, I claim:—

1. In a launching and landing means for aircraft, the combination of a craft having a waterborne base, a wheeled carriage hinged at its rear portion to said base to swing in a vertical plane so as to dispose the wheels thereof above and below the horizontal plane of the bottom of said base, locking means carried by the forward portion of the carriage to engage and lock the same to the base when said carriage is arranged in landing position, and means for raising the carriage and controlling the lowering movement thereof, said means being operative for releasing said locking means.

2. In a launching and landing means for aircraft, the combination of a craft having spaced pontoons, a unitary wheeled carriage hingedly supported on and operable between said pontoons for vertical movement to dispose the wheels thereof above and below the horizontal plane of the base portions of the pontoons, means for raising and lowering the carriage, and means for locking the same to the pontoons in landing position.

3. In launching and landing means for aircraft, the combination of a craft having spaced pontoons, said pontoons being provided with keepers, a unitary wheeled landing carriage hingedly supported on and operable between the pontoons for vertical swinging movement so as to dispose the wheels thereof above and below the plane of the bases of said pontoons, locking devices upon the carriage to engage said keepers to lock the carriage in landing position, and means for raising the carriage and retracting said locking devices.

4. In launching and landing means for aircraft, the combination of a craft having spaced pontoons, said pontoons being provided with keepers, a unitary wheeled landing carriage hingedly supported on and operable between the pontoons for movement in a vertical plane so as to project and retract the wheels below and above the plane of the lower faces thereof, automatically projectable locking devices upon the carriage to engage said keepers and lock the same in landing position to the pontoons, and controlling means for retracting said locking devices and raising the carriage to retracted position.

5. In launching and landing means for aircraft, the combination of a craft having spaced pontoons, a unitary wheeled landing carriage hinged at its rear to the upper surfaces of said pontoons and operable between the same, locking elements upon the forward portion of the carriage to engage the pontoons and lock the carriage thereto in lowered position, and controlling means operative for unlocking the carriage and raising the same to retracted position.

6. In launching and landing means for aircraft, the combination of a craft having spaced pontoons, said pontoons being provided with keepers, a unitary wheeled landing carriage hinged to said pontoons for vertical movement between the same, between projected and retracted positions, spring actuated locking bolts on the carriage to engage the keepers and lock the carriage in projected position, and controlling means for retracting said bolts and raising the carriage.

7. In launching and landing means for aircraft, the combination of a craft having spaced pontoons, said pontoons being provided with keepers, a wheeled landing carriage pivotally mounted at its rear portion to the upper surfaces of said pontoons and having its front portion provided with tubular bolt guides, spring actuated locking bolts disposed in said guides and projectable to engage the keepers to lock the carriage in projected position, and controlling means for retracting and releasing said bolts and raising the carriage.

8. In launching and landing means for aircraft, the combination of a craft having spaced pontoons, said pontoons being provided with transverse keepers open at the inner sides of the pontoons, a wheeled landing carriage hinged to said pontoons for movement in a vertical plane to projected and retracted positions, said carriage being provided with transversely disposed bolt guides, spring actuated bolts mounted in said guides for engagement with the keepers to lock the carriage in projected position, and controlling means for retracting the bolts and raising the carriage.

9. In launching and landing means for aircraft, the combination of a craft having spaced pontoons, said pontoons being provided with keepers, spring actuated locking devices to engage said keepers, controlling means for retracting the bolts and raising the carriage, and latch devices for holding the bolts retracted and operative on the downward movement of the carriage to release the bolts for a locking action.

10. In launching and landing means for aircraft, the combination of a craft having spaced pontoons, said pontoons being provided with keepers, a unitary wheeled landing carriage hinged to the pontoons for movement between the same between projected and retracted positions, spring actuated locking bolts on the carriage to engage the keepers and lock the carriage in projected position, and controlling means operative on its initial movement to first release the bolts and thereafter to effect the movement of the carriage to raised position.

11. In launching and landing means for aircraft, the combination of a craft having spaced pontoons, said pontoons being provided with keepers, a wheeled landing carriage of unitary construction mounted for swinging movement vertically between said pontoons, spring actuated locking bolts to engage said keepers and lock the carriage in projected position, a cable or the like having terminal portions connected with the bolts, and a controlling element engaging said cable and operative to draw thereon to release the bolts and thereafter raise the carriage.

12. In launching and landing means for aircraft, the combination of a craft having spaced pontoons, said pontoons being provided with keepers, a wheeled landing carriage of unitary construction mounted for movement between the pontoons between projected and retracted positions, spring actuated locking bolts disposed transversely upon the carriage to engage the keepers and lock the carriage in projected position, a cable having its terminals connected with the bolts and its intermediate portion formed with a bight or loop, and controlling means including a cable engaging the bight of the first named cable and operative to draw upon said first named cable to release the bolts and thereafter raise the carriage.

13. In launching and landing means for aircraft, the combination of a craft having spaced pontoons, said pontoons being provided with keepers, a wheeled landing carriage hinged to the pontoons for vertical movement between the same between projected and retracted positions, spring actuated locking bolts on the carriage to engage the keepers and lock the carriage in projected position, latch devices automatically operative to engage and hold the bolts when released in retracted position, means for releasing the bolts from the keepers and raising the carriage to retracted position, and means for retracting the latches and releasing the bolts for a locking action.

14. In launching and landing means for aircraft, the combination of a craft having spaced pontoons, a wheeled landing carriage of unitary construction carried by and movable in the space between the pontoons to project and retract the wheels thereof, means for locking the carriage in projected position to the pontoons, and means for releasing and retracting the carriage.

15. In launching and landing means for aircraft, the combination of a craft having spaced pontoons, said pontoons being provided with keepers, a wheeled landing carriage having a rear cross bar hinged to the pontoons and having a tubular front bar, said carriage being arranged to swing vertically in the space between the pontoons, spring actuated bolts mounted in said tubular cross bar and adapted for engagement with the keepers to lock the carriage in projected position, and means for retracting said bolts and raising and retracting the carriage.

16. In launching and landing means for aircraft, the combination of a craft having spaced pontoons, a wheeled landing carriage carried by and movable in the space between the pontoons to project and retract the wheels thereof, spring actuated bolts upon the carriage, said pontoons being provided with keepers to receive said bolts and with recessed portions adjacent to said keepers, spring actuated latches to engage and hold the bolts retracted when adjusted to releasing position, said latches adapted to seat in said recessed portions and to be retracted by contact therewith to release the bolts when the carriage is lowered to projected position, and means for retracting the bolts and raising the carriage.

17. In launching and landing means for aircraft, the combination of a craft having spaced pontoons, said pontoons being provided with keepers and with recessed portions adjacent thereto, a pivoted wheeled landing carriage mounted on said pontoons, said carriage being provided with spring actuated latches to engage and hold the bolts retracted when adjusted to releasing position, said latches adapted to seat in said recessed portions and to be retracted by contact therewith to release the bolts when the carriage is lowered to projected position, and means for retracting the bolts and raising the carriage.

18. In launching and landing means for aircraft, a craft having a waterborne base formed of spaced pontoons, a wheeled landing carriage hinged at its upper rear portion to the upper surfaces of the pontoons, said carriage being thereby mounted to swing vertically in the space between the pontoons, locking means for rigidly fixing the upper front portions of the carriage to the pontoons when the carriage is lowered and in launching position, and means for releasing said locking means and swinging the carriage upwardly to retracted position.

19. In launching and landing means for aircraft, the combination of a craft having spaced pontoons, a wheeled landing carriage of unitary construction carried by and movable in the space between the pontoons to project and retract the wheels thereof, means for locking the carriage to said pontoons in its projected position, and a single means for releasing said locking means and moving said carriage to its retracted position.

20. In launching and landing means for aircraft, the combination of a craft having a water-borne base consisting of a pair of spaced pontoons, a wheeled carriage of unitary construction hingedly supported on said pontoons and operable for swinging movement between the same, keepers secured on said pontoons, spring actuated bolts secured on said carriage, and means for raising and lowering said carriage, said means acting to withdraw said bolts from operative engagement with said keepers simultaneously with the raising movement of said carriage.

21. In launching and landing means for aircraft, the combination of a craft having a water-borne base consisting of a pair of spaced pontoons, a wheeled carriage of unitary construction hingedly supported on said pontoons and operable for swinging movement between the same, keepers secured on said pontoons, spring actuated bolts secured on said carriage, means for holding said bolts retracted in the raised position of said carriage, said means being automatically actuated to release said bolts when said carriage is moved to its lower position, and means for raising and lowering said carriage, said means acting to withdraw said bolts from operative engagement with said keepers simultaneously with the raising movement of said carriage.

22. In launching and landing means for aircraft, the combination of a craft having spaced pontoons, a wheeled landing carriage of unitary construction carried by and movable in the space between the pontoons to project and retract the wheels thereof, means for locking the carriage to said pontoons in its projected position, a carriage operating mechanism within the fuselage of the craft, and a connecting means between said carriage and said operating mechanism, said connecting means operating to release said locking means during the initial movement of said operating mechanism for the retracting of said carriage.

23. In launching and landing means for aircraft, the combination of a craft having spaced pontoons, a wheeled landing carriage of unitary construction carried by and movable in the space between the pontoons to project and retract the wheels thereof, means for locking the carriage to said pontoons in its projected position, a carriage operating mechanism within the fuselage of the craft, and a cable between said carriage and said operating mechanism, said cable operating to release said locking means during the initial movement of said operating mechanism for the retracting of said carriage.

In testimony whereof I affix my signature.

HEBER BUTTS.